US010315459B2

(12) United States Patent
    Ma

(10) Patent No.: US 10,315,459 B2
(45) Date of Patent: Jun. 11, 2019

(54) ULTRALIGHTWEIGHT AIRLESS ATV WHEELS BASED UPON NEGATIVE POISSON RATIO (NPR) AUXETIC STRUCTURES

(71) Applicant: MKP Structural Design Associates, Inc., Dexter, MI (US)

(72) Inventor: Zheng-Dong Ma, Ann Arbor, MI (US)

( * ) Notice: Subject to any disclaimer, the term of this patent is extended or adjusted under 35 U.S.C. 154(b) by 39 days.

(21) Appl. No.: 15/208,793

(22) Filed: Jul. 13, 2016

(65) Prior Publication Data

US 2017/0015134 A1  Jan. 19, 2017

Related U.S. Application Data

(60) Provisional application No. 62/191,736, filed on Jul. 13, 2015.

(51) Int. Cl.
| | |
|---|---|
| *B60B 1/00* | (2006.01) |
| *B60B 9/26* | (2006.01) |
| *B60B 5/02* | (2006.01) |
| *B60C 7/10* | (2006.01) |
| *B60C 7/16* | (2006.01) |

(52) U.S. Cl.
CPC ............ *B60B 1/006* (2013.01); *B60B 5/02* (2013.01); *B60B 9/26* (2013.01); *B60C 7/102* (2013.01); *B60C 7/16* (2013.01); *B60B 2900/111* (2013.01); *B60B 2900/311* (2013.01); *B60B 2900/351* (2013.01); *B60C 2007/107* (2013.01); *Y02T 10/86* (2013.01)

(58) Field of Classification Search
CPC .......... Y02T 10/86; B60B 1/006; B60B 5/02; B60B 9/26; B60B 2900/351; B60B 2900/111; B60B 2900/311; B60C 7/10
USPC ...................................... 152/5, 7, 11, 12, 17
See application file for complete search history.

(56) References Cited

U.S. PATENT DOCUMENTS

| | | | |
|---|---|---|---|
| 6,621,829 B1 * | 9/2003 | Achilles | H04L 29/06 370/235 |
| 7,490,539 B2 | 2/2009 | Ma | |
| 7,563,497 B2 | 7/2009 | Ma | |
| 7,694,621 B1 | 4/2010 | Ma | |
| 7,910,193 B2 | 3/2011 | Ma | |
| 8,544,515 B2 | 10/2013 | Ma et al. | |
| 9,376,796 B2 | 6/2016 | Ma | |
| 9,416,839 B2 | 8/2016 | Ma | |
| 2011/0240189 A1 * | 10/2011 | Dutton | B60B 9/04 152/1 |

(Continued)

*Primary Examiner* — S. Joseph Morano
*Assistant Examiner* — Jean W Charleston
(74) *Attorney, Agent, or Firm* — John G. Posa; Belzer PC

(57) ABSTRACT

Improvements are disclosed regarding the way in which vehicle wheels are designed and assembled, including ultralight, airless vehicle wheels adapted for mounting on a rim to receive a tire. One or more flexible ring-shaped tendons are disposed over the rim. A stuffer component is disposed over the tendons, and the wheel is disposed over the stuffer. A cover is bolted onto the rim holding the stuffer and tendons in position. Importantly, the tendons, stuffer and cover are all installed onto the rim from the outside toward the vehicle, thereby easing installation and maintenance. The invention may be adapted for all-terrain vehicles, and the wheel may have diameter on the order of 7 inches, 14 inches, or any other appropriate dimensions.

10 Claims, 17 Drawing Sheets

ATV 7 inch
N-wheel
front view

(56) References Cited

U.S. PATENT DOCUMENTS

| | | | |
|---|---|---|---|
| 2012/0007415 A1* | 1/2012 | McCorry | B60B 7/0013 301/37.106 |
| 2014/0034219 A1* | 2/2014 | Chadwick | B60O 7/18 156/113 |
| 2015/0091367 A1* | 4/2015 | Young | B60B 7/066 301/37.105 |
| 2015/0251493 A1* | 9/2015 | Ma | B60C 7/14 152/80 |

* cited by examiner

ATV 7 inch N-wheel front view

ATV 7 inch N-wheel back view

Assembling view

Fiber-reinforced plastic

Cover

Fiber-reinforced plastic

Stuffer

ATV 14 inch N-wheel front view

ATV 14 inch N-wheel back view

Figure 11 Assembling view

Fiber-reinforced plastic or Aluminum

Cover

Rubber composite

Tendon

ULTRALIGHTWEIGHT AIRLESS ATV WHEELS BASED UPON NEGATIVE POISSON RATIO (NPR) AUXETIC STRUCTURES

REFERENCE TO RELATED APPLICATION

This application claims priority from U.S. Provisional Patent Application Ser. No. 62/191,736, filed Jul. 13, 2015, the entire content of which is incorporated herein by reference.

FIELD OF THE INVENTION

This invention relates generally to vehicle wheels and, in particular, to ultra-lightweight, airless ATV wheels based upon negative Poisson ratio (NPR) auxetic structures.

BACKGROUND OF THE INVENTION

My issued U.S. Pat. No. 8,544,515 discloses lightweight wheels and runflat tires based upon negative Poisson's ratio (NPR) or auxetic structures. A wheel with NPR tire is called N-Wheel in this application, which is considered as an integrated product of traditional wheel (rim) and tire. The N-Wheels can be tailored and functionally-designed to optimally meet the various requirements for both military and commercial vehicles. N-Wheels may be fabricated using standard materials and simple manufacturing processes, resulting in low-cost and high-volume production. Among many other possibilities, the disclosed designs are two new evolutions of the original N-Wheel concept, with a number of following new features: 1) reflecting the practical manufacturability and fabrication issues; 2) reflecting assembly process with the consideration of mass production; 3) in the first design, the inner layer of the stuffers is integrated with the rim as one integrated part to be fabricated; 4) tendons (top layer of the nested V shapes in the NPR structure) are now formed by continuous belt-like material and each layer is separated as multiple specially-designed belts; and 5) with essential three-dimensional manufactural details. Note that the disclosed designs are readily utilizable or be modified for the wheels of forklifts, lawn mowers, recreation utility vehicles (RUV), and etc.

An auxetic wheel according to the '515 patent comprises a line defining an axis of rotation; and a plurality of concentric rings of unit cells surrounding the axis, each unit cell being constructed of a plurality of members defining a Negative Poisson's Ratio (NPR) structure. The outermost ring of unit cells is arranged to facilitate rolling terrain contact, such that the stiffness of the structure in the localized region of loading increases due to terrain contact increases as the wheel rotates.

A layer of material may be disposed between the concentric rings of unit cells which in preferred embodiments comprise a plurality of nested-V shapes. A cover may be provided over the outermost ring of unit cells forming a tire which may, or may not, be inflated.

SUMMARY OF THE INVENTION

This invention improves upon the way in which vehicle wheels are designed and assembled, including ultralight, airless vehicle wheels adapted for mounting on a rim to receive a tire. In accordance with the invention, one or more flexible ring-shaped tendons are disposed over the rim. A stuffer component is disposed over the tendons, and the wheel is disposed over the stuffer. A cover is bolted onto the rim holding the stuffer and tendons in position. In the preferred embodiment, the tendons, stuffer and cover are all installed onto the rim from the outside toward the vehicle.

The stuffer may be constructed from a plurality of components having V-shaped cross sections, and the rim may include a plurality of spokes with elongate axial spaced-apart surfaces. In this embodiment, the tendon(s) are disposed between the V-shaped components of the stuffer and the spaced-apart surfaces to create a negative Poisson ratio (NPR) or auxetic structure, whereby the stiffness of the structure in the localized region of loading increases due to terrain contact as the wheel rotates.

The stuffer may be a fiber-reinforced composite, magnesium, or aluminum, while the tendons are preferably a rubber or rubber-like material. The rim and cover may be a fiber-reinforced composite, magnesium, aluminum or combinations/alloys thereof.

The vehicle wheel may further include a plurality of stuffers and one or more ring-shaped tendons between each pair of stuffers. Each stuffer may be constructed from a plurality of components having V-shaped cross sections, and each tendon may be disposed between the V-shaped components of each stuffer to create a negative Poisson ratio (NPR) or auxetic structure whereby the stiffness of the structure in the localized region of loading increases due to terrain contact as the wheel rotates.

The invention may be adapted for all-terrain vehicles, and the wheel may have diameter on the order of 7 inches, 14 inches, or any other appropriate dimensions.

DETAILED DESCRIPTION OF THE INVENTION

The disclosure of U.S. Pat. No. 8,544,515 is incorporated herein by reference in its entirety. This invention improves upon and extends those teachings in several significant ways. First, an alternative assembly method is possible, enabling the components to be installed from one side of the wheel and bolted in place. The invention is applicable to any type of vehicle tire, although two diameters of all-terrain-vehicle (ATV) designs are described in detail.

Figure 1:
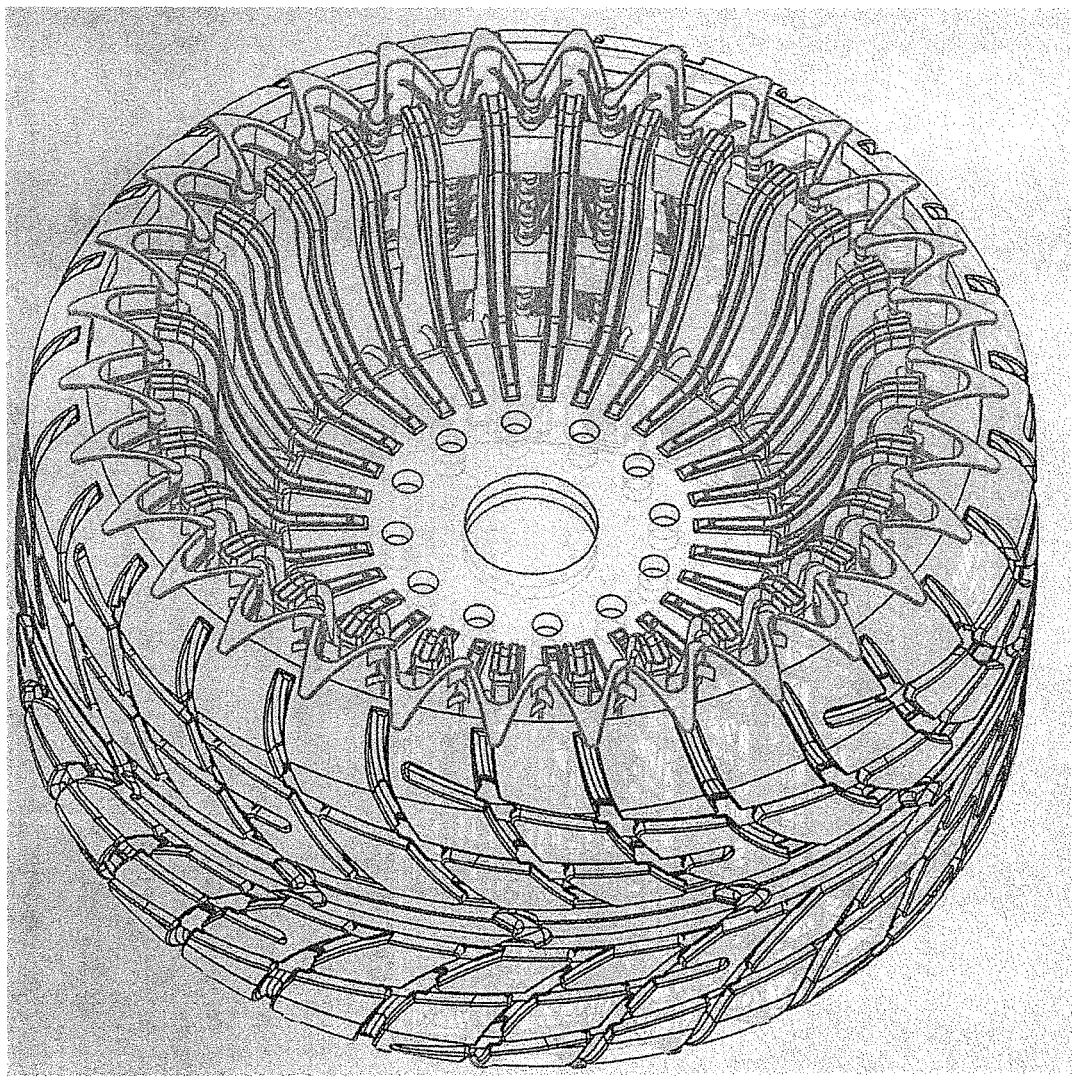
FIG. 1 is an oblique outer view of a 7-inch ATV N-wheel constructed in accordance with the invention.
Figure 2:
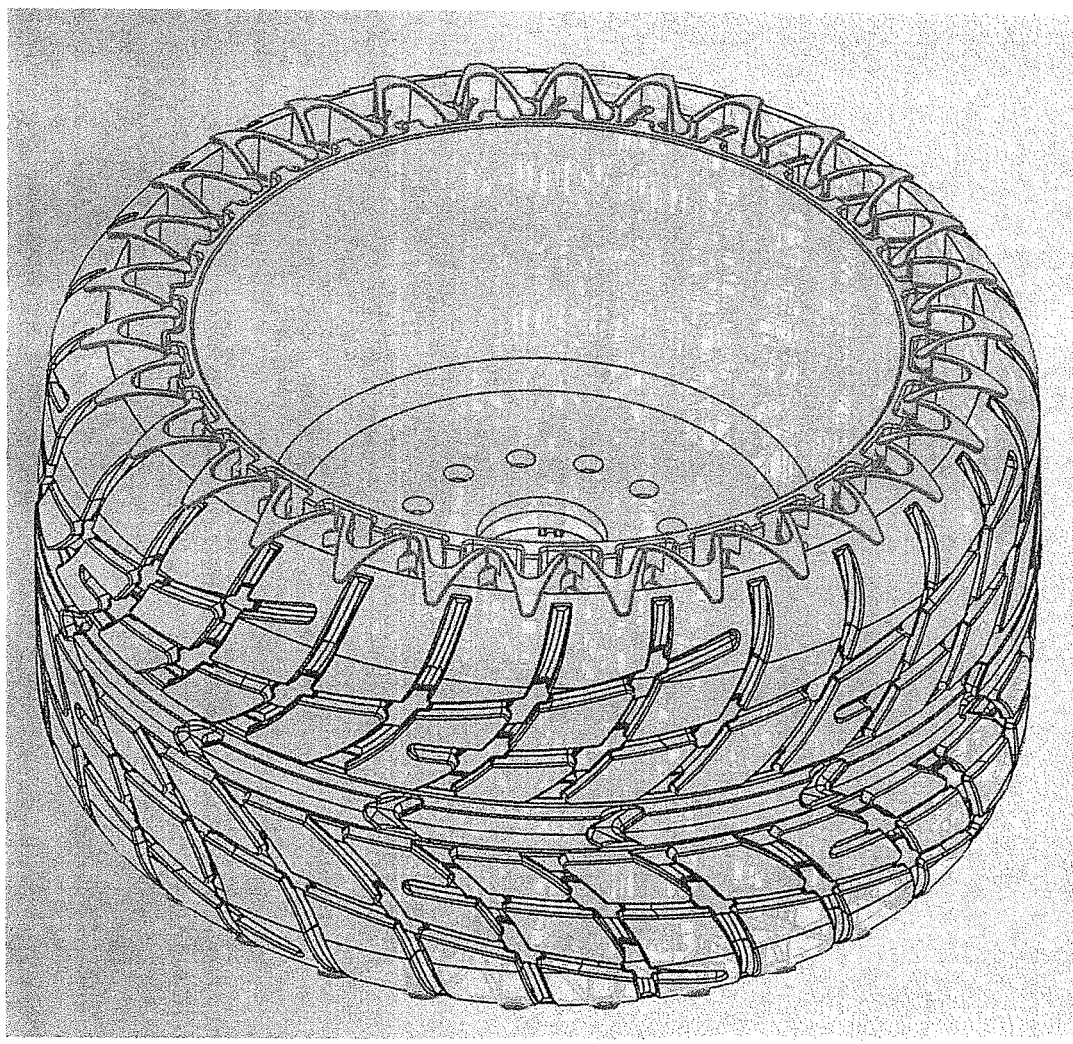
FIG. 2 is an oblique inner view of the structure of FIG. 1.
Figure 3:
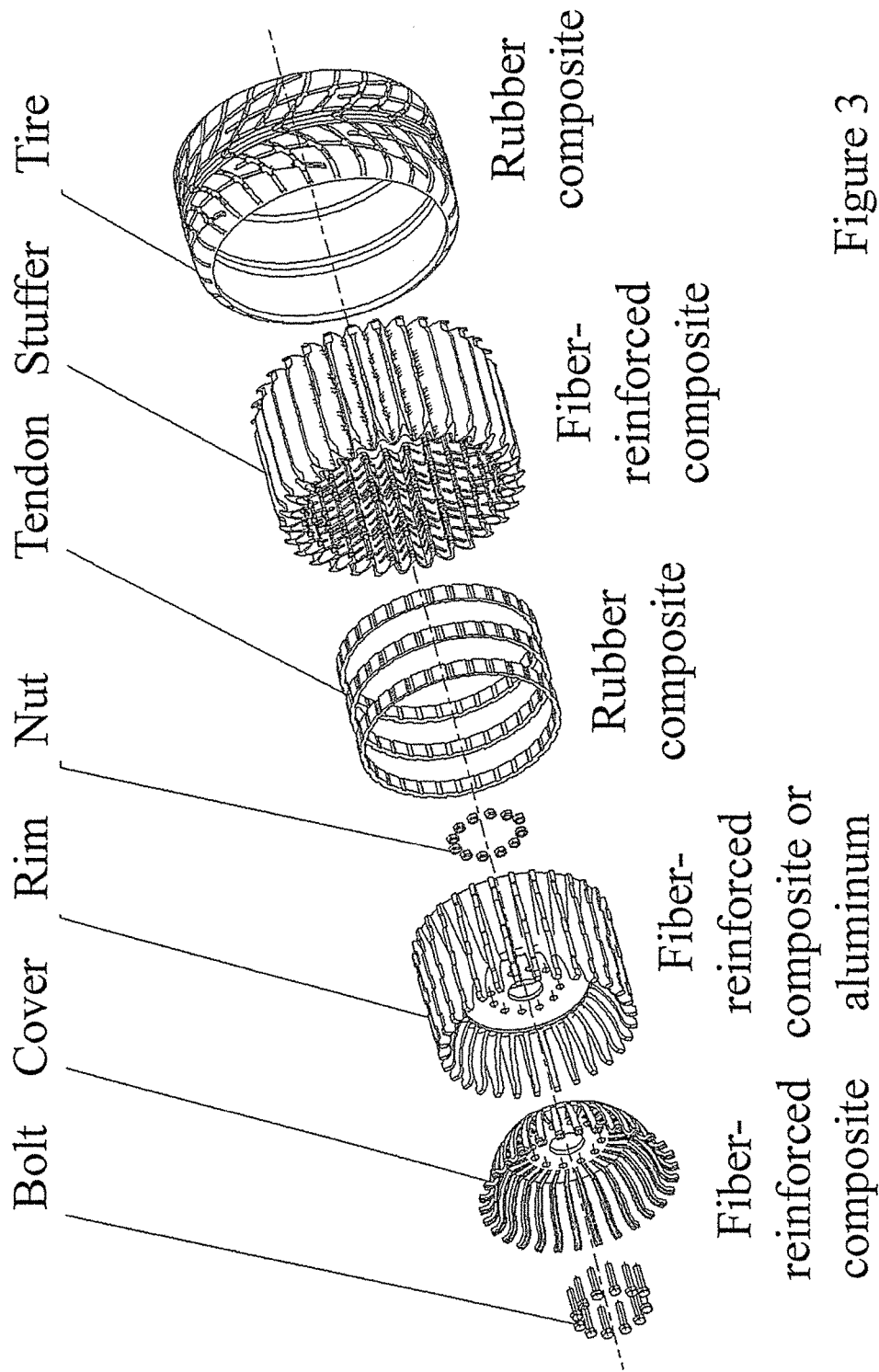
FIG. 3 is an exploded view illustrating the way in which the wheel is assembled.

FIG. 1 is an oblique outer view of a 7-inch ATV N-wheel constructed in accordance with the invention. FIG. 2 is an oblique inner view. FIG. 3 is an exploded view illustrating the way in which the wheel is assembled. A fiber-reinforced composite stuffer component is received by the tire, typically a rubber composite material. The tendon pieces, also of a rubber or rubber-like composite, are inserted into the stuffer. The assembly further receives a rim component, which may be composed of a fiber-reinforced composite or lightweight metal such as aluminum. A cover fits into the rim, which is held in position with nuts and bolts. The cover may also be constructed of a lightweight, fiber-reinforced composite.

Figure 4:
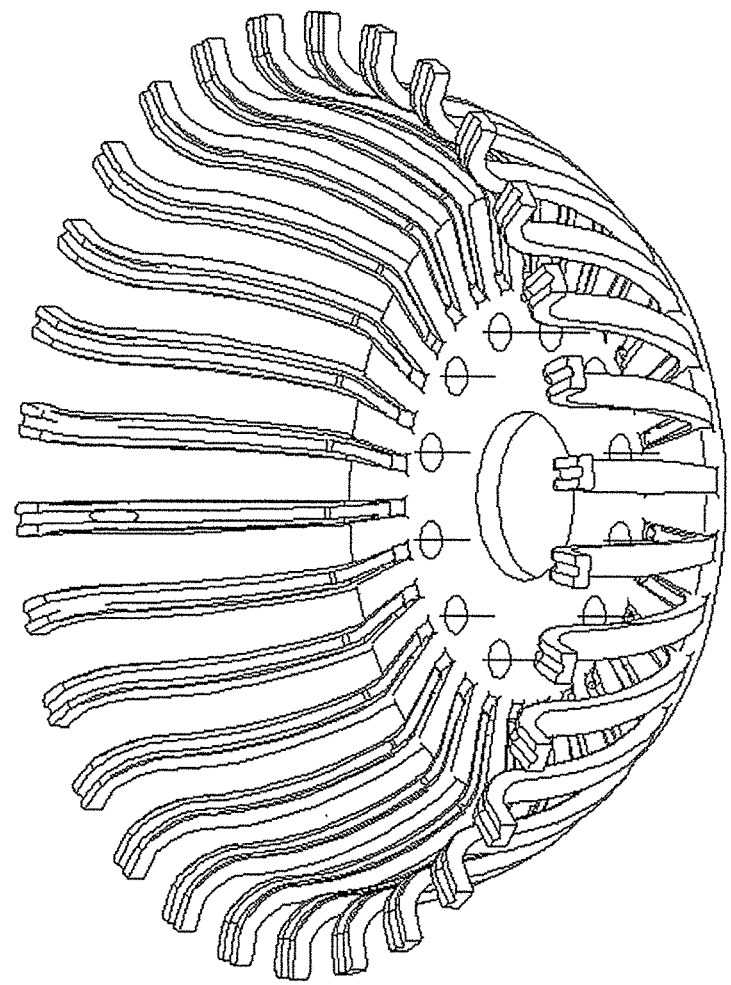
FIG. 4 is an oblique, detail drawing of a wheel cover.
Figure 5:
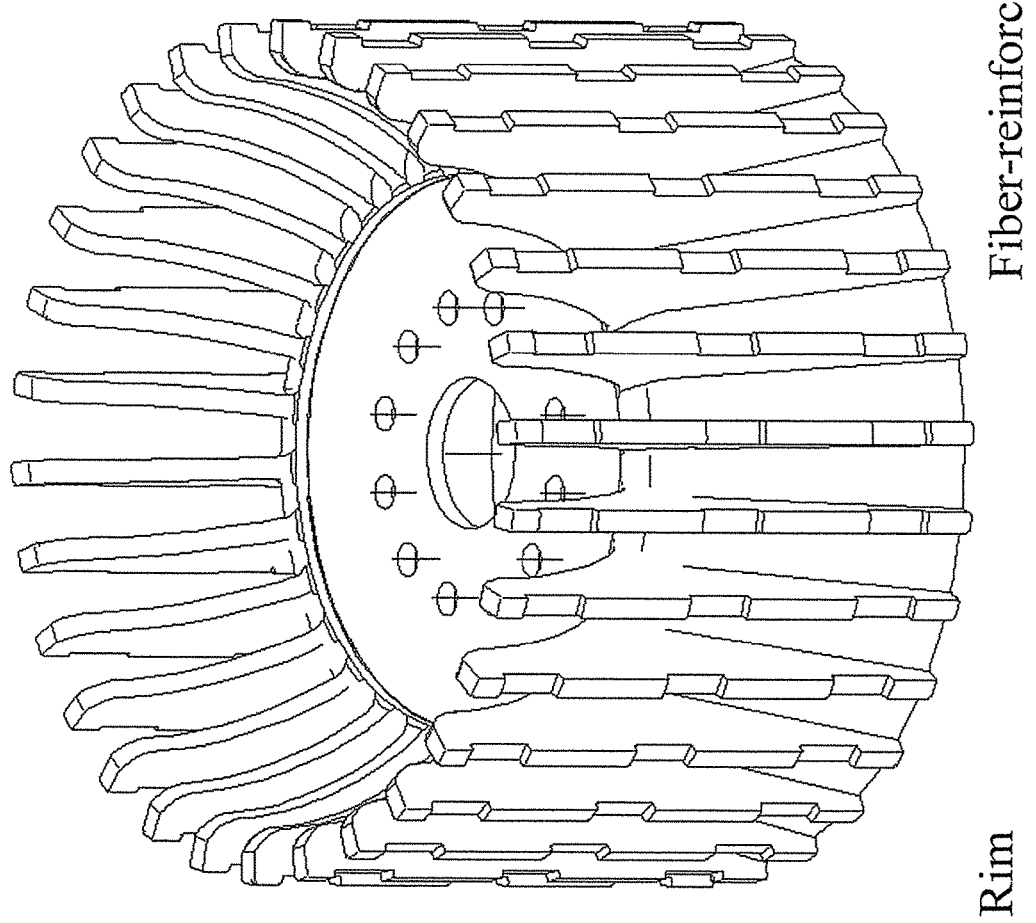
FIG. 5 is an oblique, detail drawing of a rim structure.
Figure 6:
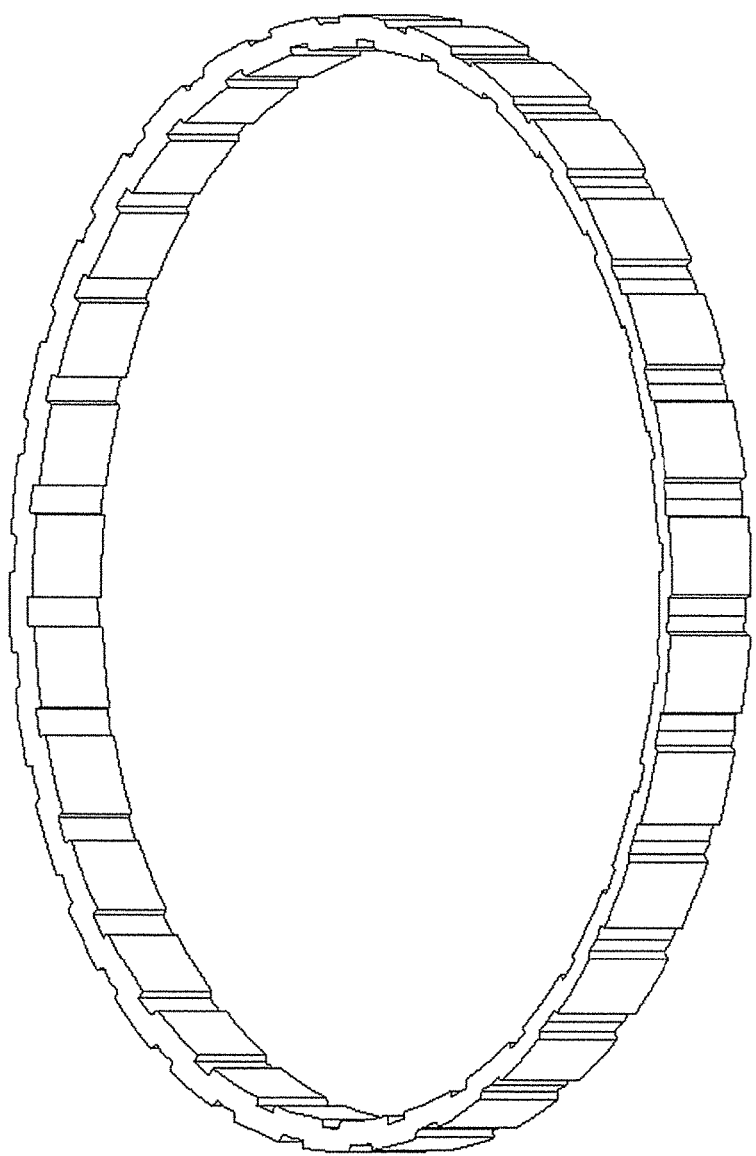
FIG. 6 is an oblique, detail drawing of one of the tendon components.
Figure 7:
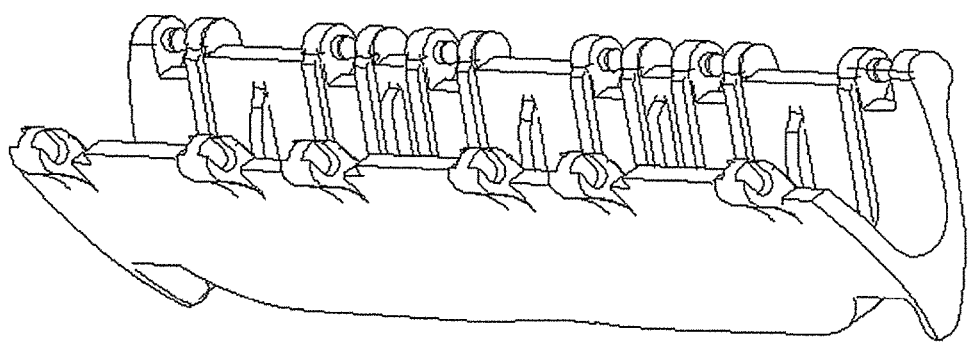
FIG. 7 is an oblique, detail drawing of one of the stuffer components.
Figure 8:
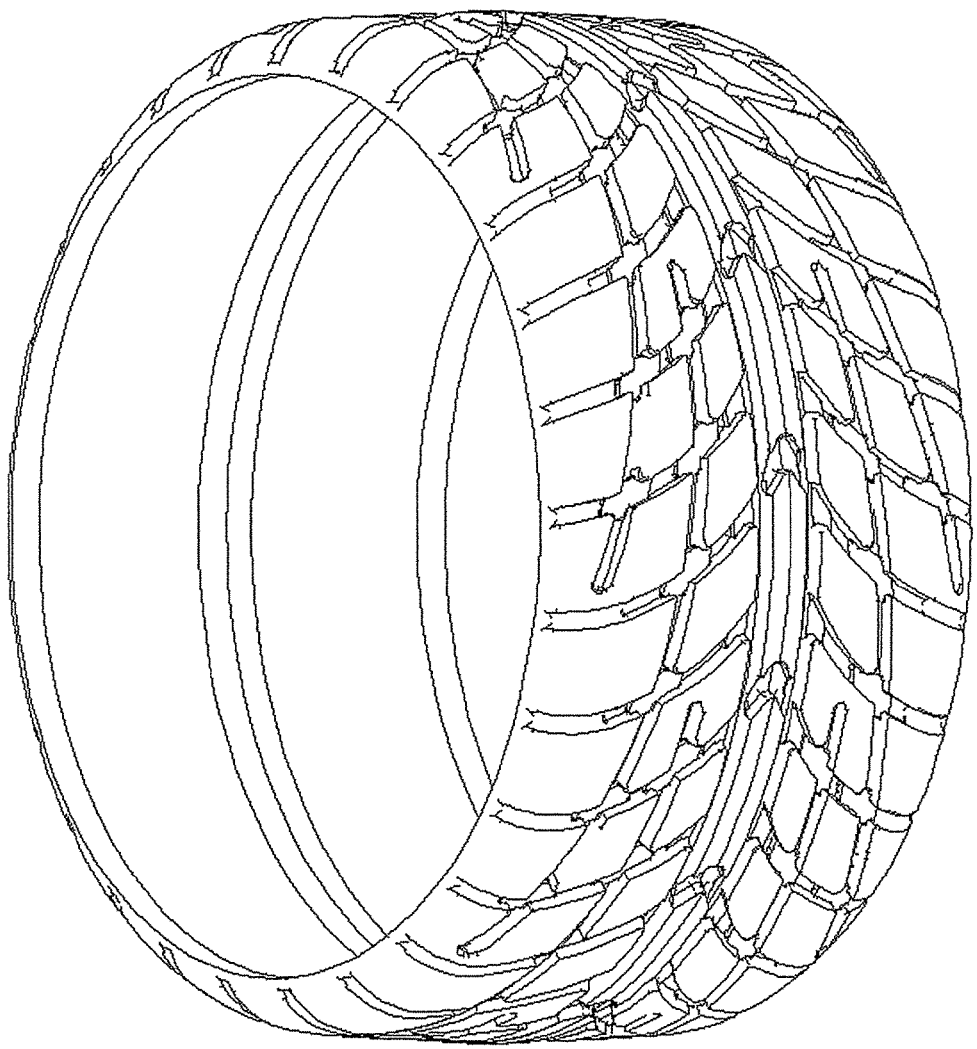
FIG. 8 is an oblique, detail drawing of a tire applicable to the invention.

FIG. 4 is an oblique, detail drawing of the cover. FIG. 5 is an oblique, detail drawing of the rim. FIG. 6 is an oblique, detail drawing of one of the tendon components. FIG. 7 is an oblique, detail drawing of one of the stuffer components. This drawing also shows features on the two elongate edges of the component, enabling the stuffers to be clipped to one another to form a circular shape. FIG. 8 is an oblique, detail drawing of a tire applicable to the invention.

Figure 9:
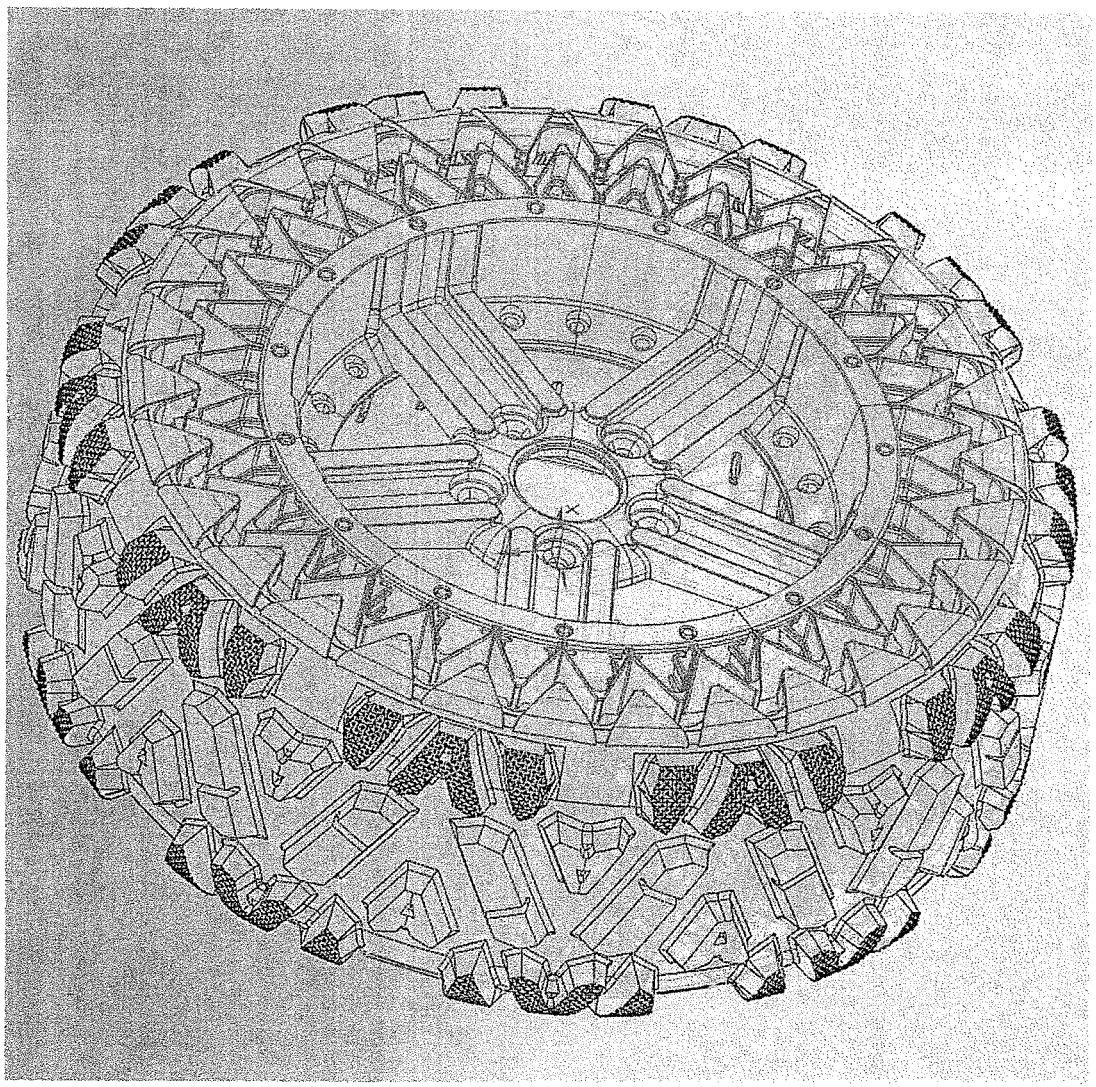
FIG. 9 is an oblique outer view of a 14-inch ATV N-wheel constructed in accordance with the invention.
Figure 10:
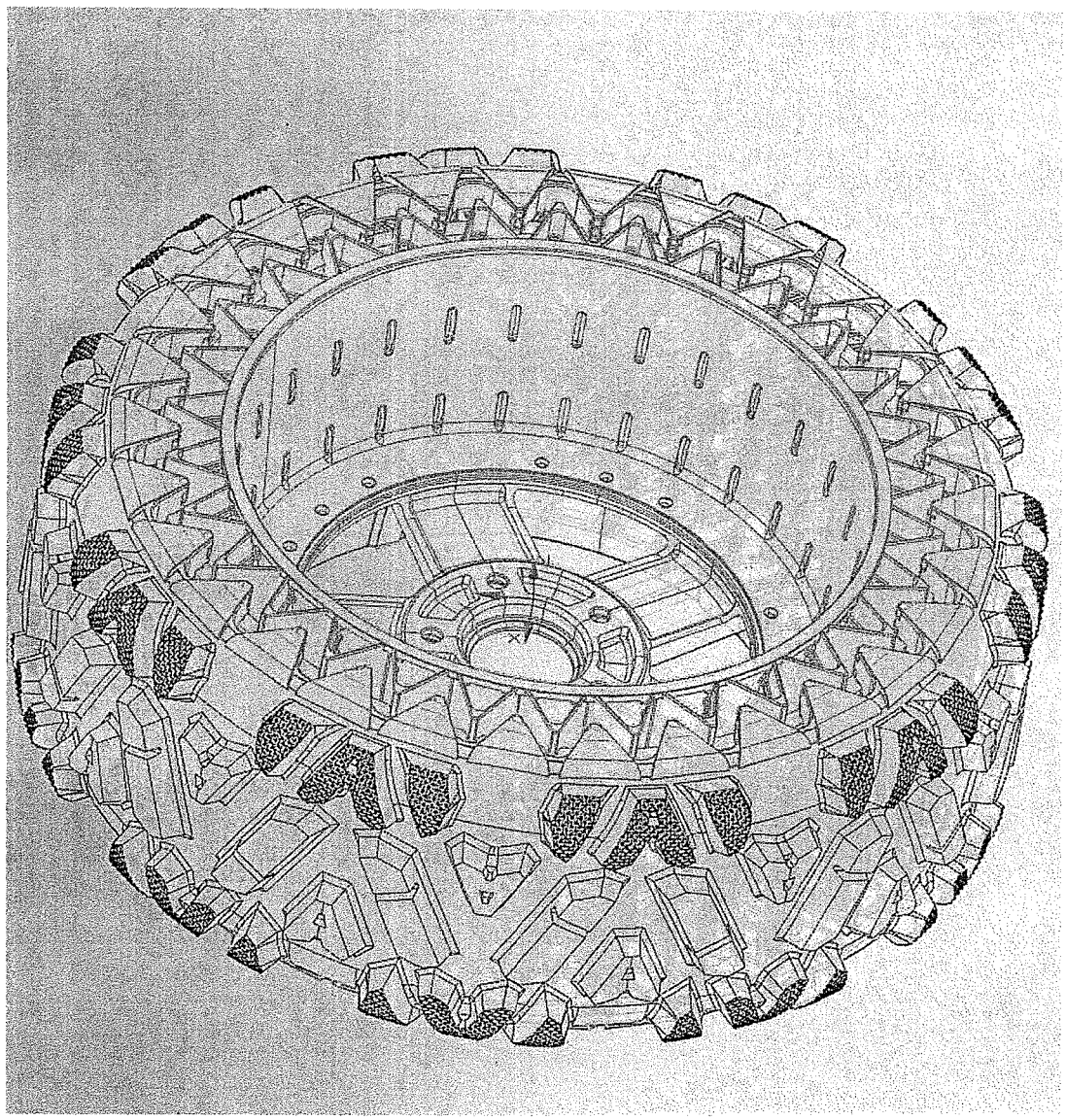
FIG. 10 is an oblique inner view of the 14-inch version of the invention.
Figure 11:
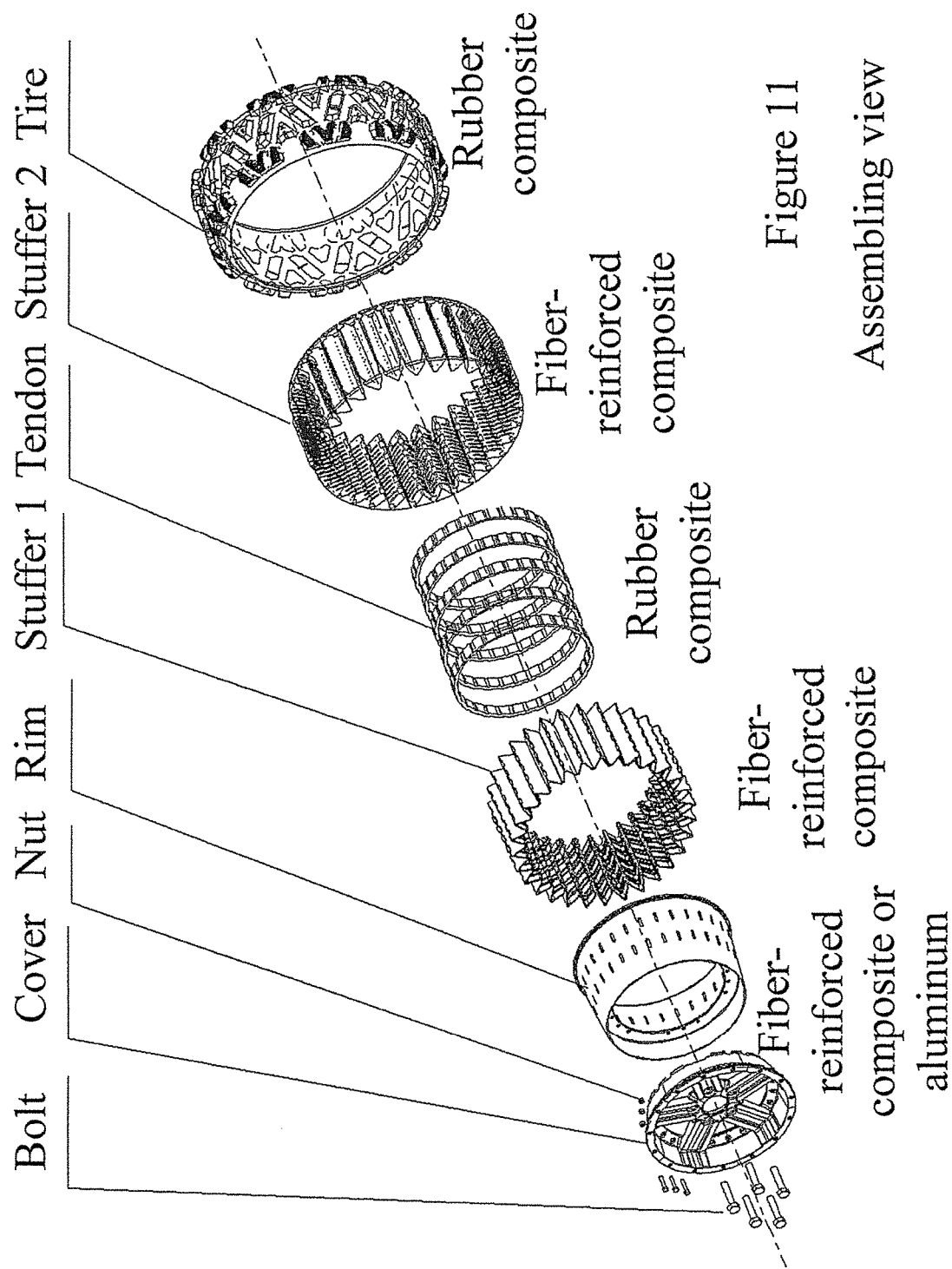
FIG. 11 is an exploded view illustrating the way in which the wheel is assembled.

FIG. 9 is an oblique outer view of a 14-inch ATV N-wheel constructed in accordance with the invention. FIG. 10 is an oblique inner view. FIG. 11 is an exploded view illustrating the way in which the wheel is assembled. The assembly is similar to the 7-inch version, with a major different that the inner stuffer layer is separated from the rim, in addition to appropriate modification for the larger size. The conic shape of the rim (as well as associated interface details between the rim and stuffers) is designed with the consideration of a new assembly process that can suit mass production. Other features include, for example, the tire would typically feature a different tread pattern, and a larger number of tendons may be used to accommodate a greater width. Further, multiple stuffers may be used to accommodate the larger diameter and achieve greater weight bearing. Finally, the cover may be bolted onto the rim in a different manner.

Figure 12:
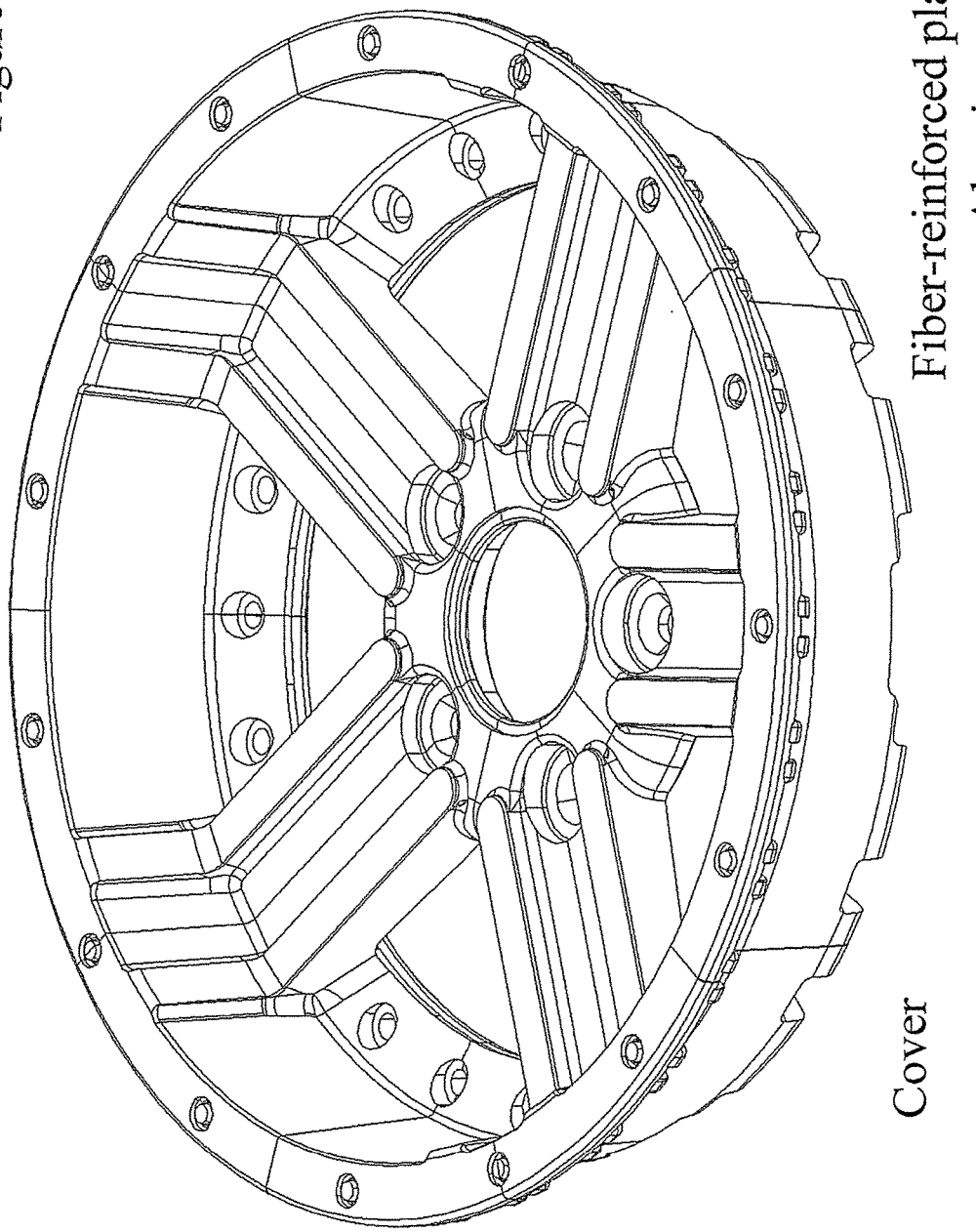
FIG. 12 is an oblique, detail drawing of the cover.
Figure 13:
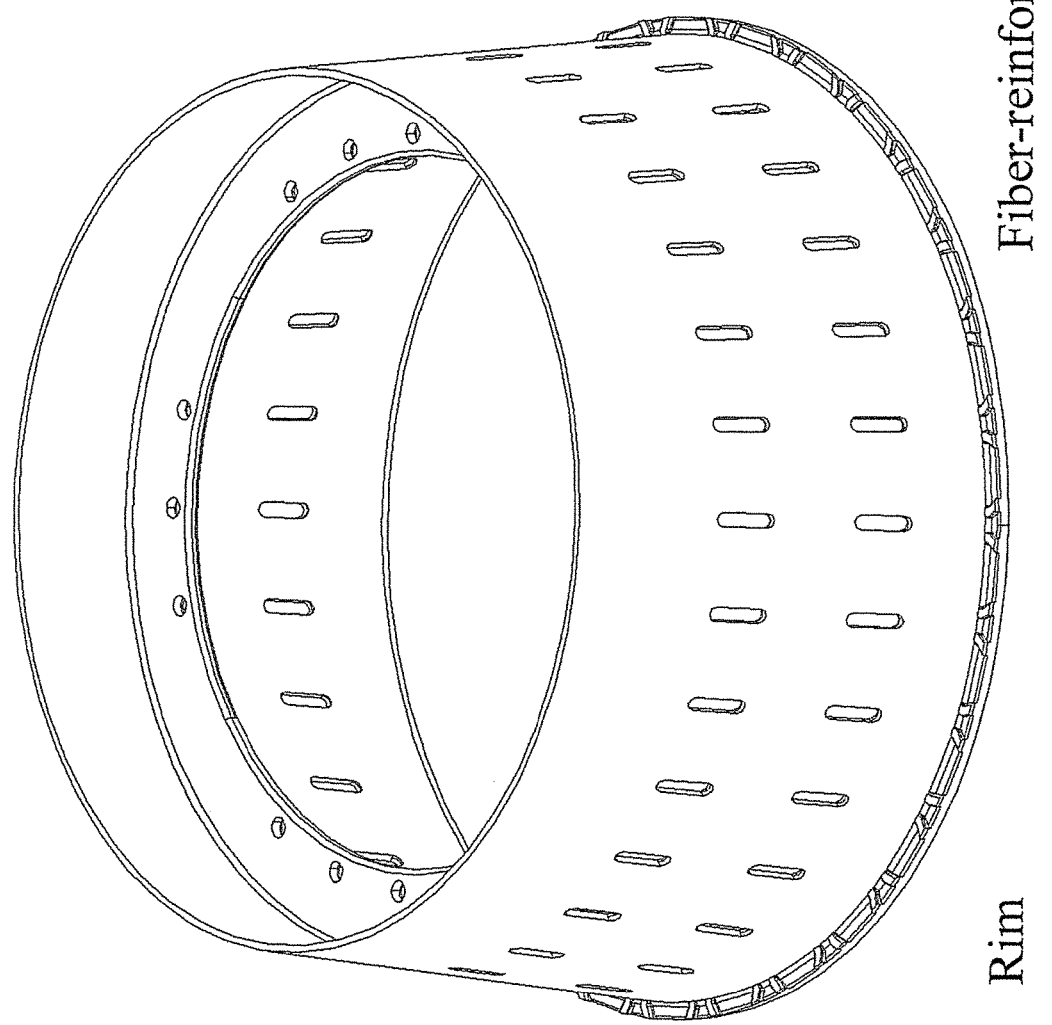
FIG. 13 is an oblique, detail drawing of the rim.
Figure 14:
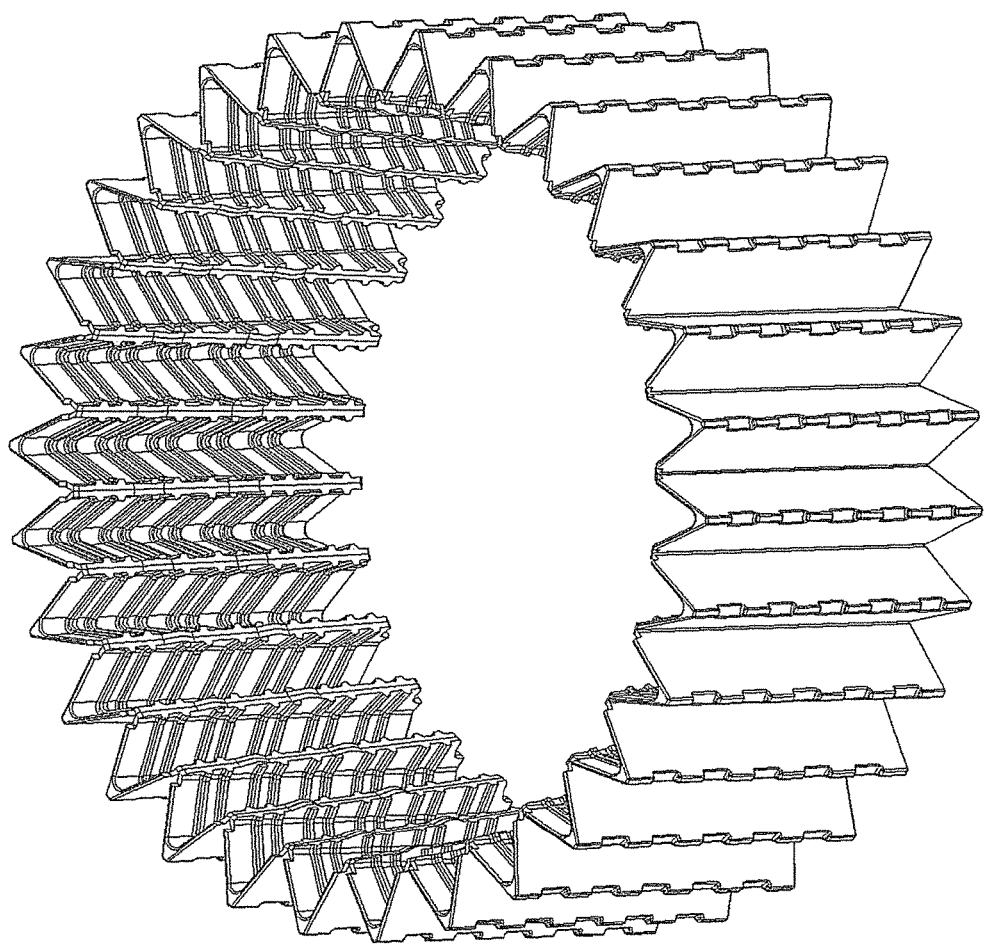
FIG. 14 is an oblique, detail drawing of one of the stuffer components.
Figure 15:
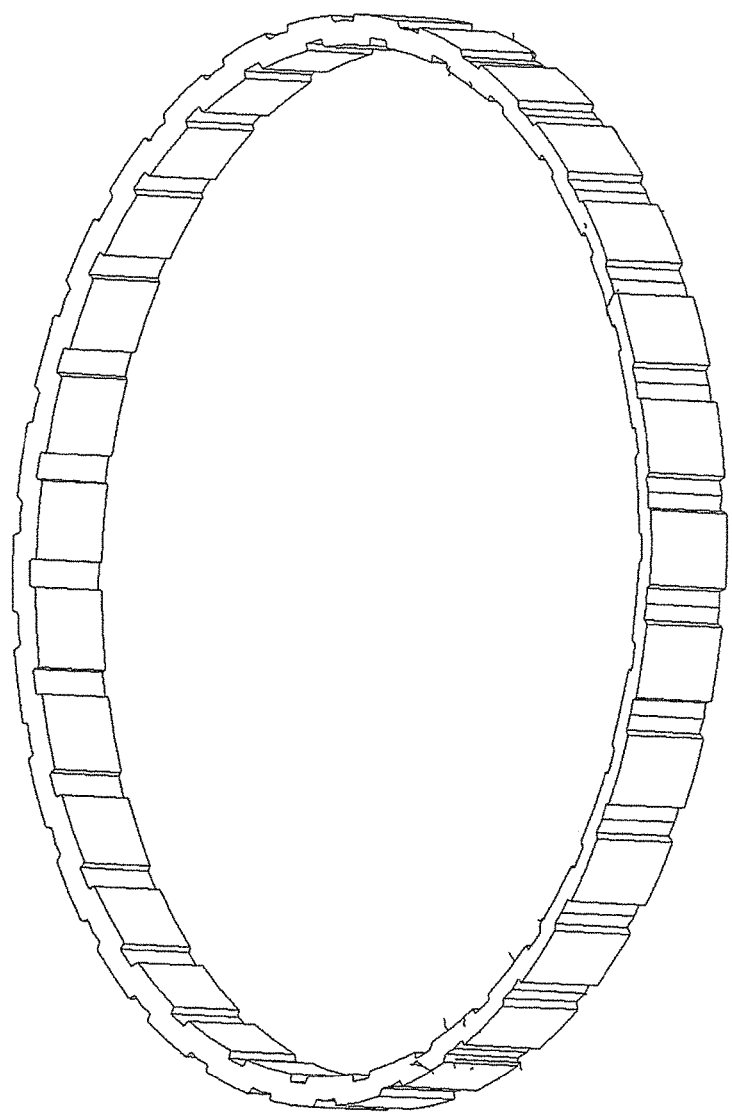
FIG. 15 is an oblique, detail drawing of one of the tendon components.
Figure 16:
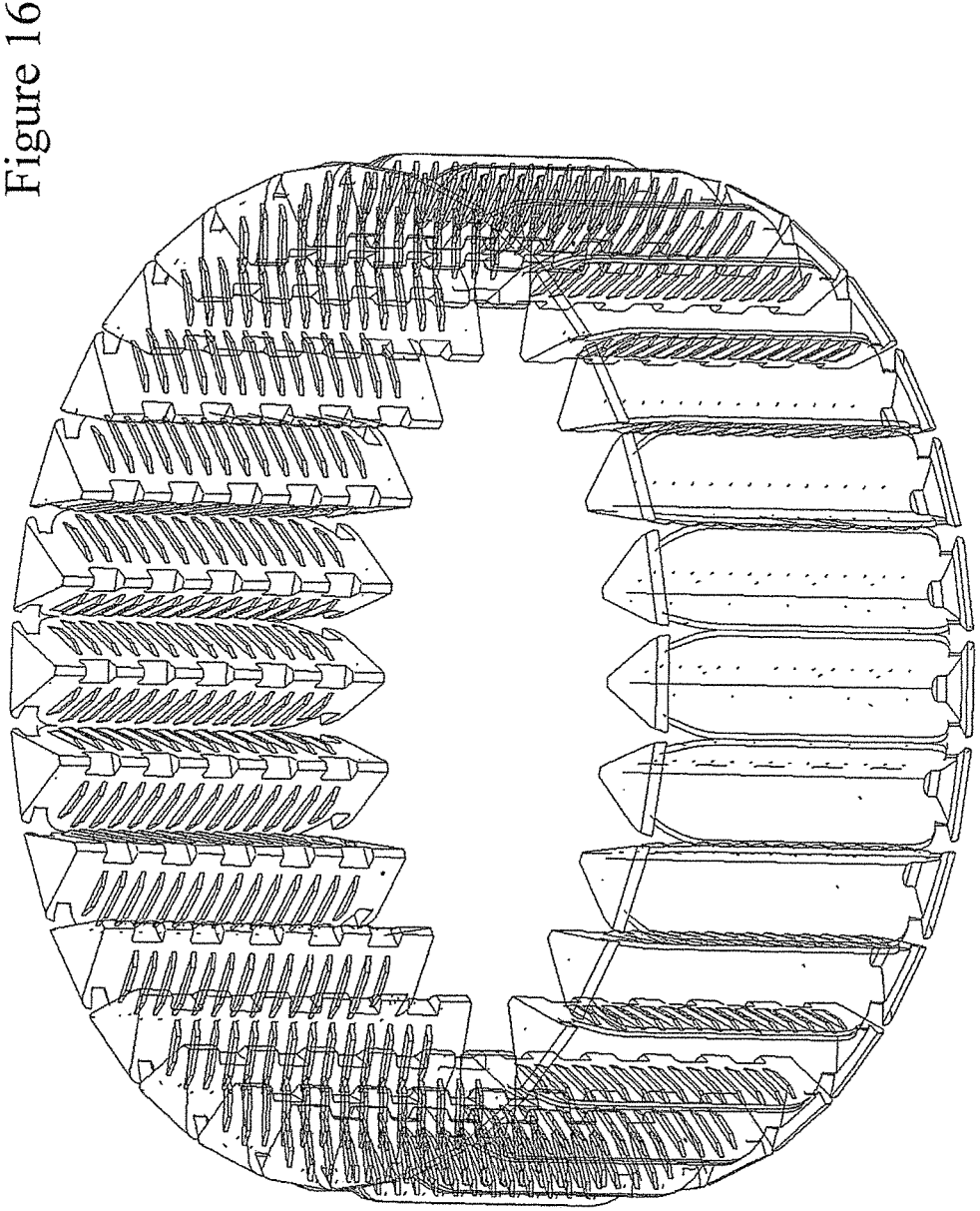
FIG. 16 is an oblique, detail drawing of another one of the stuffer components.
Figure 17:
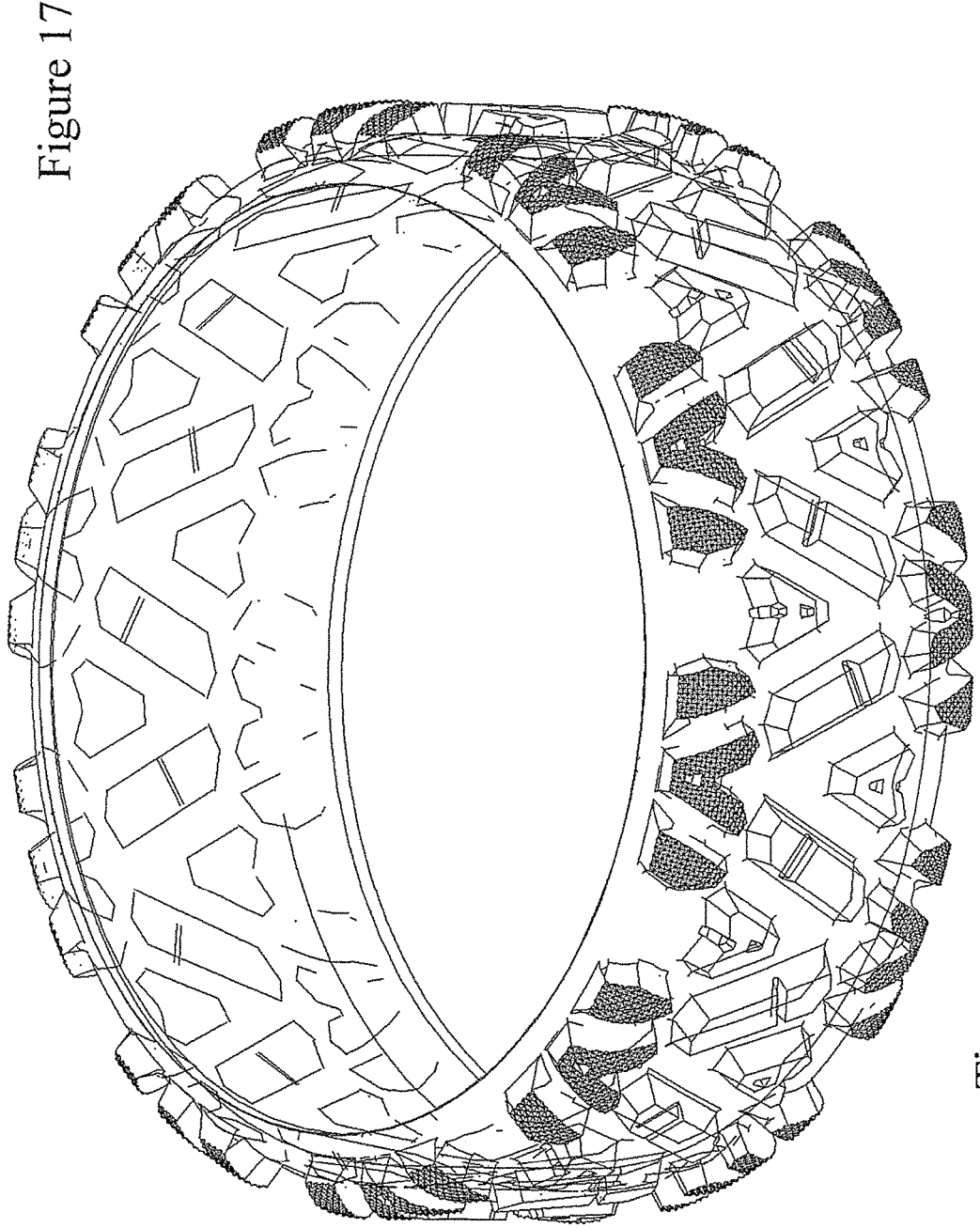
FIG. 17 is an oblique, detail drawing of a tire applicable to the 14-inch embodiment of the invention.

FIG. 12 is an oblique, detail drawing of the cover. FIG. 13 is an oblique, detail drawing of the rim. FIG. 14 is an oblique, detail drawing of one of the stuffer components. FIG. 15 is an oblique, detail drawing of one of the tendon components. FIG. 16 is an oblique, detail drawing of another one of the stuffer components. FIG. 17 is an oblique, detail drawing of a tire applicable to the 14-inch embodiment of the invention.

The invention claimed is:

1. An ultralight, airless vehicle wheel adapted for mounting on a rim to receive a tire, comprising:
   a circular rim including a plurality of spokes with elongate axial spaced-apart surfaces;
   one or more flexible ring-shaped tendons disposed over the rim;
   a stuffer component disposed over the tendons, the stuffer component being constructed from a plurality of interconnected components with V-shaped cross sections;
   wherein each of the interconnected components has a pair of parallel, spaced-apart outer elongate edges, and wherein each of the edges includes a structure enabling the edge of one component to be joined directly to the edge of a different one of the components, such that the stuffer component forms a physically separate corrugated circular ring with a plurality of parallel, spaced-apart inner edges and a plurality of parallel, spaced-apart outer edges;
   wherein the one or more tendons are disposed between the inner edges of the stuffer and the spaced-apart surfaces of the rim to create a negative Poisson ratio (NPR) or auxetic structure whereby the stiffness of the structure increases due to terrain contact as the wheel rotates;
   a tire disposed over the stuffer;
   a cover bolted onto the rim holding the stuffer and tendons in position; and
   wherein tendons, stuffer and cover are all installed onto the rim from the outside toward the vehicle.

2. The ultralight, airless vehicle wheel of claim 1, wherein the stuffer is a fiber-reinforced composite, magnesium, or aluminum.

3. The ultralight, airless vehicle wheel of claim 1, wherein the tendons are a rubber or rubber-like material.

4. The ultralight, airless vehicle wheel of claim 1, wherein the rim is a fiber-reinforced composite, magnesium, or aluminum.

5. The ultralight, airless vehicle wheel of claim 1, wherein the cover is a fiber-reinforced composite, magnesium, or aluminum.

6. The ultralight, airless vehicle wheel of claim 1, further including:
   a plurality of stuffers; and
   one or more ring-shaped tendons between each pair of stuffers.

7. The ultralight, airless vehicle wheel of claim 6, wherein:
   each stuffer is a corrugated ring constructed from a plurality of interconnected components having V-shaped cross sections; and
   each tendon is disposed between the V-shaped components of each stuffer to create a negative Poisson ratio (NPR) or auxetic structure whereby the stiffness of the structure in the localized region of loading increases due to terrain contact as the wheel rotates.

8. The ultralight, airless vehicle wheel of claim 1, adapted for an all-terrain vehicle.

9. The ultralight, airless vehicle wheel of claim 1, wherein the wheel has a diameter on the order of 7 inches.

10. The ultralight, airless vehicle wheel of claim 1, wherein the wheel has a diameter on the order of 14 inches.

* * * * *